United States Patent [19]

Konstant et al.

[11] Patent Number: 4,678,091
[45] Date of Patent: Jul. 7, 1987

[54] BEAM TO COLUMN CONNECTION

[75] Inventors: Anthony N. Konstant, Winnetka; John J. Weider, Arlington Heights, both of Ill.

[73] Assignee: Konstant Products, Inc., Skokie, Ill.

[21] Appl. No.: 894,363

[22] Filed: Aug. 7, 1986

[51] Int. Cl.⁴ .............................................. A47F 5/00
[52] U.S. Cl. .................................... 211/191; 211/182; 403/388; 403/408.1
[58] Field of Search ............... 211/182, 186, 187, 189, 211/190, 191, 192, 193; 403/388, 408.1

[56] References Cited

U.S. PATENT DOCUMENTS 3,398,981  8/1968  Vincens .......................... 211/186 X
3,554,477  1/1971  D'Altrui .......................... 211/193 X
4,078,664  3/1978  McConnell ....................... 211/189
4,291,812  9/1981  Harmes et al. .................. 211/182 X Primary Examiner—Robert W. Gibson, Jr.
Attorney, Agent, or Firm—George H. Gertsman; Garrettson Ellis

[57] ABSTRACT

A structure such as a rack comprises columns connected together by beams, positioned in transverse relation to the columns. The rack is provided for use in warehouses or elsewhere. For example, pallets may be placed across pairs of beams for storage in the rack. By this invention, means are provided for retaining the beams and columns in a range of positions of registry in which first apertures in the columns and second apertures in the beams overlap in offset relation. Bolts extend through the overlapping first and second apertures, with the first and second apertures being each of larger diameter than the bolt means. The distance of overlap between the first and second apertures should be typically less than the diameter of the bolts. As a result of this, the beams and columns can be tightly affixed together by the bolts despite unpredictable positional variations in the beams and columns as they are so affixed.

9 Claims, 4 Drawing Figures

BEAM TO COLUMN CONNECTION

BACKGROUND OF THE INVENTION

The invention of this application relates to an improvement in the design of rack in which vertical beams and horizontal columns are attached together by bolts, for simple assembly and disassembly. Welded racks may be strong, but they cannot be easily disassembled for moving, and the labor involved in welding them together is substantial.

Bolted racks, while easily assembled, exhibit the problem that any looseness in the beam to column connection will result in a leaning, wobbling rack. This in turn induces higher stresses in many of the components which might cause collapse of a heavily loaded rack. Also, problems may arise because of irregularities in the floor of the warehouse or other place where the rack is positioned. This, along with small errors in the length and width of the beams and columns as well as the positioning of bolt holes therein, can result in the creation of unpredictable positional variations in the beams and columns as one attempts to affix them together. This, in turn, may create significant difficulties in getting a tightly bolted connection between the beams and columns, since the parts may not quite fit precisely together because of the unpredictable positional variations.

Thus, the final result may be a less than satisfactory leaning or wobbling rack, which may be quite unacceptable in any circumstances.

In accordance with this invention means are provided for affixing beams and columns together by bolt means in a tight, rigid manner despite unpredictable positional variations in the beams and columns as they are so affixed.

While racks are specifically contemplated as the environment for the use of this invention, other structures besides racks may take advantage of this invention as well, such as frames, buildings, mezzanines, or any other structure using a beam to column connection, or any connection between structural members.

DESCRIPTION OF THE INVENTION

In this invention, one may connect a first structual member to a second structural member where the first and second structural members respectively define first and second apertures.

By this invention, one performs the steps of (1) inserting bolt means through the first and second apertures, (2) drawing the first and second apertures toward each other into essential contact, while the first and second apertures overlap each other in offset relation. The bolt means is of less diameter than each of the first and second apertures. The distance of overlap of the first and second apertures is less than the diameter of the bolt means, with the bolt means projecting through each of said first and second apertures at an acute angle to said apertures, i.e., to the plane of said apertures. At the same time, one (3) provides means to prevent the first and second apertures from entering into concentric relation and the bolt means from becoming perpendicular to the apertures as the first and second structural members are drawn together into essential contact by the bolt means.

Typically the bolt means may be a conventional nut and bolt system. For reasons previously stated, the columns and beams, or other structural members, may not fit together with precision, due to the unpredictable positional variations of the beams and columns as initially assembled. As one places a bolt through the first and second apertures, and draws the two apertures together by tightening a nut on the bolt, the bolt will assume a skewed relation with each of the apertures at an acute angle other than perpendicular, because the first and second apertures will tend to overlap each other in offset relation. The bolt can act like a lever, forcing the misaligned apertures together and toward alignment. One also provides means, typically a lateral wall on one of the structural members, which prevents the first and second apertures from entering into the normal, concentric relation of apertures which are bolted together. This also prevents the bolt means from ever assuming a perpendicular relation to the apertures, but instead it retains its skewed, acute angled relation with the two apertures.

The effect of this is, as the structual members are brought into essential contact by compressing action of the bolt head and the advancing nut on the other end of the bolt, the first and second apertures are prevented from becoming concentric and from permitting their amount of overlap to become equal to or greater than the diameter of the bolt. Thus, the bolt is driven into a firm, metal-crushing, gripping relationship with the two structural members, causing strong, gripping retention. In particular, the crushed threads may serve as a means for preventing the nut from coming loose after it has been forcefully screwed home, driving the two structural members into connected relation. Thus, a heavy rack or other structure may be assembled despite the initial unpredictable positional variations in the beams and columns, for example, as one attempts to affix them together, resulting in rigid, strong connections.

Hence, the structure of this invention may comprise at least one column connected to at least one beam positioned in transverse relation to the column. The column carries at least one first aperture and the beam at least one second aperture.

Means are provided for retaining the beam and column in tight contact in which the first and second apertures overlap each other in offset relation. The retaining means includes bolt means (which term is intended to include structural equivalants to a bolt such as rivets or the like) extending through the pair of overlapping first and second apertures. The first and second apertures are each of larger diameter than the bolt extending through them, with the distance of overlap between the first and second apertures in their positions of registry being less than the diameter of the bolt means.

As a result of this, the beam and column can be tightly and rigidly affixed together by the bolt means, despite unpredictable positional variations in the beam and column as they are so affixed. The reasons for why this is can be more clearly understood by reference to the description of the specific embodiment and the drawings.

When a structure such as a rack is used, at least four columns may be connected together by a plurality of beams in accordance with this invention. The beams and columns used in this invention may be made by easy modification of standard channel iron, I-beams, square tubing, or the like, by an appropriate drilling or punching of the first and second apertures.

Specifically, the beams may define at least one lateral wall, i.e., a laterally projecting, longitudinally extending flange as in channel iron. Additionally, the beams may carry end flanges projecting beyond the lateral wall. This may be accomplished simply by cutting away the side flanges of channel iron to expose and define the lateral end flange. The ends of the lateral wall or walls may be positioned to prevent the first and second apertures from moving into complete registry without offset relation. Thus, preferably, the first and second apertures of the beams and columns cannot be moved into complete overlapping registry, but instead must assume an offset relation in the assembled position of the beams and columns.

DESCRIPTION OF SPECIFIC EMBODIMENT

Figure 1:
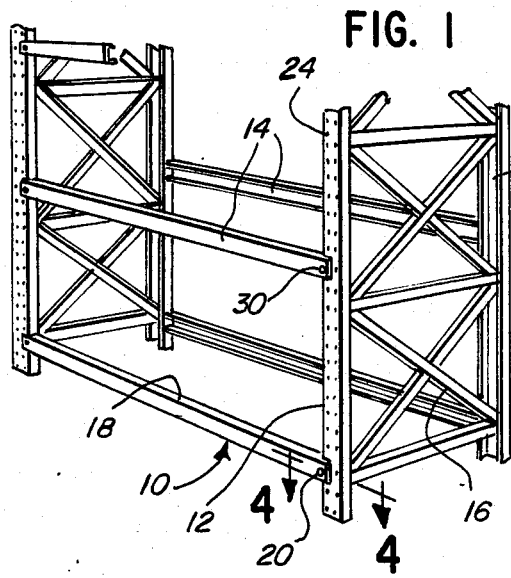
FIG. 1 is a perspective view of an assembled rack, making use of the beam to column connection of this invention.

Referring to the FIG. 1, a rack 10 is disclosed comprising a collection of columns 12 and beams 14 positioned in transverse relation to columns 12. As shown, column 12 may be made out of channel iron of U-shaped cross section, while beam 14 may also be made of channel iron as shown. The exact design of cross sectional construction of columns 12 and beams 14 is not particularly critical, so that essentially any designs of beams or columns may be used with respect to this invention.

Flat pallets carrying items to be stored may be placed on top of pairs of parallel beams 14, for storage of typically industrial items or other goods in a warehouse or the like.

Additionally, cross braces 16 may be welded between pairs of columns to provide structural support.

Figure 2:
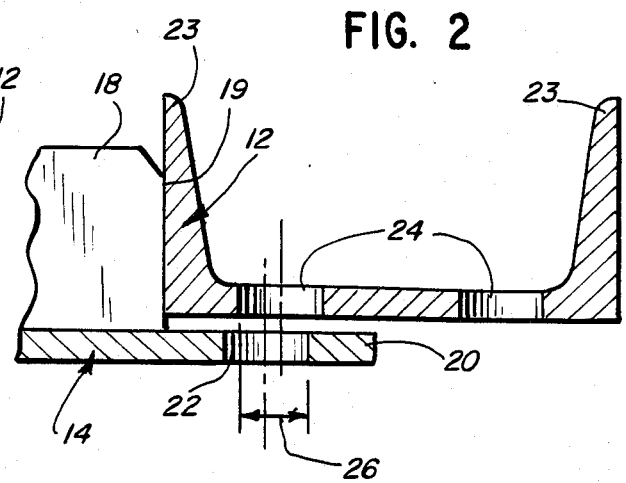
FIG. 2 is a longitudinal sectional view of a column and beam used in this invention with the first and second apertures being placed together in overlapping, offset relation.
Figure 3:
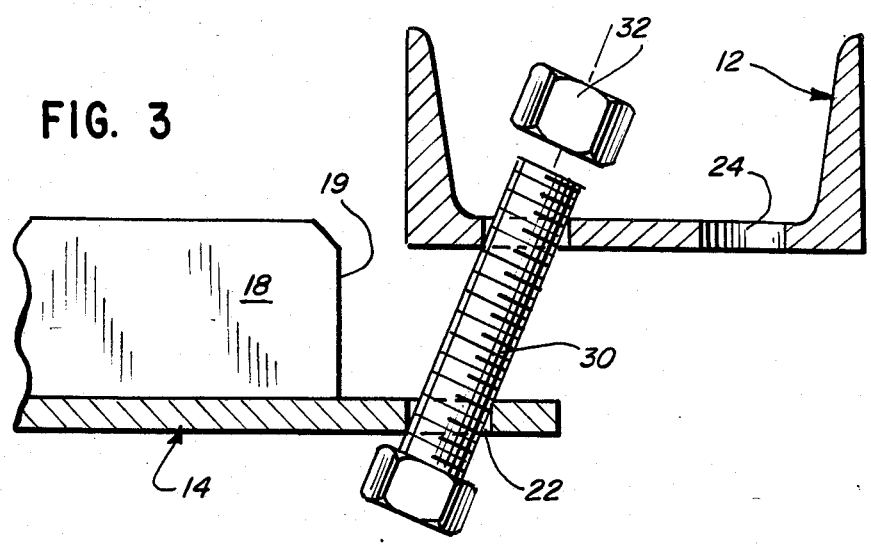
FIG. 3 is a similar transverse sectional view showing the beam and column in an intermediate stage of assembly.
Figure 4:
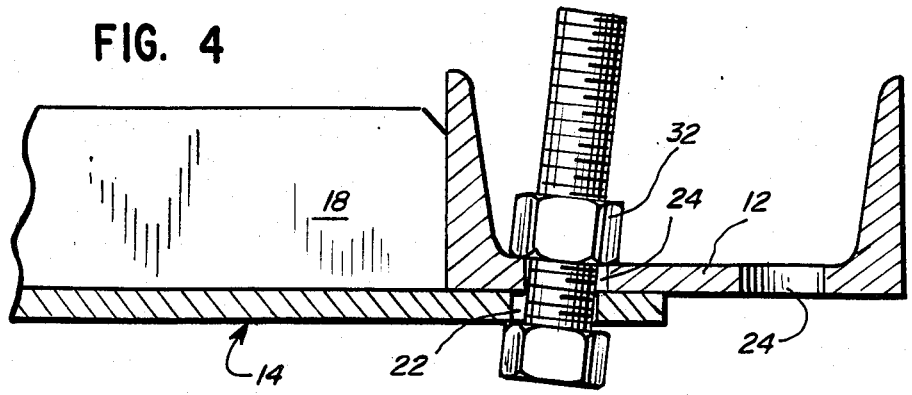
FIG. 4 is a sectional view similar to FIG. 3 showing the beam to column connection in a final stage of assembly.

Referring additionally to FIGS. 2 through 4, FIG. 2 shows details of how a column 12 and a beam 14 can fit together. Laterally positioned, longitudinally extending flanges 18 may run substantially the length of each beam 14 with the exception of end flanges 20 which project beyond lateral flanges or walls 18. Beam 14 also defines an aperture 22 defined in end flange 20, typically at each end.

Column 12, which is specifically shown to be made of channel iron, defines a pair of second flanges 23.

In the process of preparing beam 14 for use in this invention, preferably I-beam or channel iron for example may be prepared by cutting away the end portions of flanges 18 and drilling or punching second aperture 22 to provide the end structures to beams 14 as shown. Specifically, it can be seen that the outer end 19 of flange 18 is positioned so that first aperture 24 of column 12 can enter into positions of registry with second aperture 22, but in overlapping relationship, i.e., apertures 22 and 24 are offset from each other. It can be seen that the position of flange 18 prevents beam 14 and column 12 from being brought together so that apertures 22, 24 are precisely aligned, but, instead, the apertures 22, 24 are in only partially overlapping relationship, with their overlapping width being defined by arrow 26, a distance of less than the diameter of either aperture, and less than the diameter of bolt 30.

Turning to FIG. 3, column 12 and beam 14 are illustrated in a position they might occupy when the rack is in a process of assembly. To set rack 10 up, one simply connects by booting the various members until the rough structure is achieved. It may be that columns 12 and their attached cross beams 16 constitute a unitary welded structure, or, alternatively, they may be separate, boltable pieces.

In FIG. 3 it can be seen that bolt 30 is placed through each of first and second apertures 22, 24. Apertures 22, 24 are sized to be larger in diameter than bolt 30, while the common width of the overlapping portions of apertures 22, 24 is preferably of less diameter than bolt 30. When these conditions are achieved, apertures 22 and 24, even though misaligned, may be drawn together and connected by bolt 30. Nut 32 may then be tightened on bolt 30 to cause column 12 and beam 14 to be forcefully brought together by lever action of bolt 30 against apertures 22, 24 as nut 32 is tightened.

It is often preferred for each bolt 30 to be fully threaded along its length. Upon final tightening, this allows some crushing of the threads of bolt 30 against the walls of apertures 22, 24, to provide additional strength and rigidity to the connection through wedging action. Also, such crushing can help to prevent loosening of tightened nut 32. This crushing takes place because of the positioning of lateral wall 19, preventing alignment of apertures 22, 24.

In the specific embodiment of a rack as shown in the drawings, the column 12 has a cross-sectional dimension of 3"×4.1#/foot, while the beam 14 may be a piece of channel iron of similar dimension in which the ends of flange 18 have been cut away as described above.

Apertures 22, 24 may be 9/16 inch in diameter, while bolt 30 is a full-threaded bolt two inches in length and ½ inch in diameter. The optional second row of holes or apertures 24 in columns 12 is to provide connection with another set of beams 14, if desired.

Accordingly, a beam to column connection is provided in which a rigid, strong connection may exist with a high tolerance for significant positional deviation of the beam and column with respect to each other, without degradation of the rigid character of the connection.

The above has been offered for illustrative purposes only, and is not intended to limit the scope of the invention of this application, which is as defined in the claims below.

That which is claimed is:

1. In a structure which comprises at least one column connected to at least one beam positioned in transverse relation to said column, said column defining a first aperture and said beam defining a second aperture, the improvement comprising, in combination:

means for retaining said beam and column in tight contact in which said first and second apertures overlap each other in offset relation, said means including bolt means extending through said overlapping apertures, said first and second apertures being each of larger diameter than said bolt means, the distance of overlap between said first and second apertures in said positions of registry being less than the diameter of said bolt means.

2. The structure of claim 1 which constitutes a rack having at least four columns connected together by a plurality of beams.

3. The structure of claim 1 in which said columns comprise channel iron.

4. The structure of claim 1 in which said beams define at least one lateral wall, and end flanges projecting beyond said lateral wall, said end flanges carrying said second apertures, the ends of the lateral wall being positioned to prevent said first and second apertures from moving into complete registry without offset relation.

5. The structure of claim 1 in which said beams define at least one laterally positioned, longitudinally extending flange.

6. A rack, having at least four columns connected together by a plurality of beams positioned in transverse relation to said columns, each column defining first apertures and each beam defining second apertures, the improvement comprising, in combination:

means for retaining said beams and columns together in tight contact in which said first and second apertures overlap each other in offset relation, including bolt means extending through pairs of said first and second overlapping apertures, said first and second apertures being each of larger diameter than said bolt means, the distance of overlap between said pairs of first and second apertures in said positions of registry being less than the diameter of said bolt means, said beams each defining at least one lateral wall, and end flanges projecting beyond said lateral wall, said end flanges carrying said second apertures, the ends of the lateral wall being positioned to prevent said pairs of first and second apertures from moving into complete registry without offset relation.

7. The structure of claim 6 in which said columns comprise channel iron.

8. The structure of claim 7 in which said beams comprise channel iron.

9. The method of connecting a first structural member to a second structural member, said first and second structural members respectively defining first and second apertures, said method comprising: (1) inserting bolt means through said first and second apertures, (2) drawing said first and second apertures toward each other into essential contact while said first and second apertures overlap each other in offset relation, said bolt means being of less diameter than each of said first and second apertures, the distance of overlap of said first and second apertures being less than the diameter of said bolt means, said bolt means projecting through each of said first and second apertures at an acute angle to said apertures, and (3) providing means to prevent the first and second apertures from entering into more concentric relation and the bolt means from becoming perpendicular to said apertures, as the first and second structural members are drawn together by said bolt means.

* * * * *